United States Patent
Park et al.

(10) Patent No.: US 12,549,270 B2
(45) Date of Patent: Feb. 10, 2026

(54) CONTROL DEVICE FOR CONTROL SYSTEM WITH DUAL CLOCK SYNCHRONIZATION MECHANISM

(71) Applicant: Woori Technologies Corporation, Seoul (KR)

(72) Inventors: Heung Ki Park, Seoul (KR); Jun Hee Lee, Seoul (KR)

(73) Assignee: Woori Technologies Corporation, Seoul (KR)

( * ) Notice: Subject to any disclaimer, the term of this patent is extended or adjusted under 35 U.S.C. 154(b) by 328 days.

(21) Appl. No.: 18/373,348

(22) Filed: Sep. 27, 2023

(65) Prior Publication Data

US 2024/0137141 A1 Apr. 25, 2024
US 2024/0235711 A9 Jul. 11, 2024

(30) Foreign Application Priority Data

Oct. 20, 2022 (KR) ............... 10-2022-0135957

(51) Int. Cl.
*H04J 3/06* (2006.01)

(52) U.S. Cl.
CPC ................ *H04J 3/0667* (2013.01)

(58) Field of Classification Search
CPC .. G06F 1/12; G21D 3/08; G21D 3/001; H04J 3/0667; H04L 7/0008; H04L 7/0037; H04L 7/0066
See application file for complete search history.

(56) References Cited

U.S. PATENT DOCUMENTS

| | | | | |
|---|---|---|---|---|
| 9,348,321 | B2 * | 5/2016 | Dougan | G04R 40/00 |
| 9,491,727 | B2 * | 11/2016 | Webb, III | H04W 56/0035 |
| 9,954,669 | B2 * | 4/2018 | Perez-Cruz | H04W 56/002 |
| 10,735,007 | B1 * | 8/2020 | Carlson | H03L 7/093 |
| 10,903,924 | B2 * | 1/2021 | Guendert | H04J 3/12 |
| 10,958,727 | B2 * | 3/2021 | Guendert | H04L 67/1095 |
| 11,616,587 | B1 * | 3/2023 | Byagowi | H04J 3/0644 |
| | | | | 455/13.2 |

FOREIGN PATENT DOCUMENTS

| | | |
|---|---|---|
| KR | 10-2020-0021964 A | 3/2020 |
| KR | 10-2129617 A | 7/2020 |
| KR | 10-2020-0109060 A | 9/2020 |

OTHER PUBLICATIONS

Non-final Office Action mailed on Jul. 4, 2024 from the Korean Patent Office for Korean Application No. 10-2022-0135957.

* cited by examiner

*Primary Examiner* — Bailor C Hsu
(74) *Attorney, Agent, or Firm* — Insight Law Group, PLLC; Seung Lee (57) ABSTRACT

Provided is a control device for a control system with a dual clock synchronization mechanism which detects a clock synchronization problem resulting from various circumstances of a site to analyze a situation related to the clock synchronization problem and warn of the situation. Therefore, it is possible to efficiently handle a clock synchronization problem resulting from various circumstances of a site.

18 Claims, 5 Drawing Sheets

CONTROL DEVICE FOR CONTROL SYSTEM WITH DUAL CLOCK SYNCHRONIZATION MECHANISM

CROSS-REFERENCE TO RELATED APPLICATION(S)

This application claims priority from Korean Patent Application No. 10-2022-0135957, filed on Oct. 20, 2022, in the Korean Intellectual Property Office, the disclosure of which is incorporated herein by reference in its entirety.

BACKGROUND

1. Field

The following description relates to a clock synchronization technology of a control device for controlling a distributed control system, and more particularly, to a control device for a control system with a dual clock synchronization mechanism.

2. Description of Related Art

Korean Patent No. 10-2129617 (published on Jul. 2, 2020) previously filed by the applicant of this application discloses a distributed control system of which a control device has a function of preventing clock-synchronization counterfeiting attacks and clock synchronization errors to prevent control errors of the distributed control system from being caused by malicious clock-synchronization counterfeiting attacks and clock synchronization errors, and a clock synchronization method of the same.

Clock synchronization of a control system applied to nuclear plants, wind power plants, and the like is achieved by synchronizing an internal time of the system with an absolute signal for clock synchronization transmitted by a clock master device or a grand master device which is a standard time synchronization device having accurate standard time.

Here, the absolute signal for clock synchronization may be a network time protocol (NTP)-based clock synchronization signal and/or a contact signal. The NTP-based clock synchronization signal includes accurate standard time, and the contact signal is a periodic pulse signal.

Lately, a dual clock synchronization mechanism which is an improved clock synchronization technology has been in general use. The dual clock synchronization mechanism is a technology for synchronizing a system clock using both an NTP-based clock synchronization signal and a contact signal. In the dual clock synchronization mechanism, a time jump occurs when any one of the NTP-based clock synchronization signal and the contact signal is problematic.

When there is a clock synchronization error or a malicious clock-synchronization counterfeiting attack counterfeiting an NTP-based clock synchronization signal or a contact signal, a control system may have a serious problem in its control. In particular, when a control system is applied to dangerous facilities such as a nuclear plant, a wind power plant, and the like, a problem may be caused in control of the control system by a clock-synchronization counterfeiting attack or a clock synchronization error, leading to fatal consequences.

Therefore, the present applicant has researched control technology for a control system including not only a function for the control system to detect a clock-synchronization counterfeiting attack and a clock synchronization error but also a dual clock synchronization mechanism for detecting a clock synchronization problem resulting from various circumstances of a site, analyzing a situation related to the clock synchronization problem, warning of the situation, and thereby enabling efficient handling of a clock synchronization problem resulting from various circumstances.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing a control device for a control system including not only a function for the control system to detect a clock-synchronization counterfeiting attack and a clock synchronization error but also a dual clock synchronization mechanism for detecting a clock synchronization problem resulting from various circumstances of a site, analyzing a situation related to the clock synchronization problem, warning of the situation, and thereby enabling efficient handling of a clock synchronization problem resulting from various circumstances.

Technical objects to be achieved in the present invention are not limited to those described above, and other technical objects that have not been described will be clearly understood by those of ordinary skill in the art from the following description.

In one general aspect, a control device for a control system with a dual clock synchronization mechanism includes a communicator configured to receive a contact signal, which is a periodic pulse signal instructing to start clock synchronization, and a network time protocol (NTP)-based clock synchronization signal including an accurate standard time from a standard time synchronization device at set intervals, a first clock synchronizer configured to perform clock synchronization using the contact signal received by the communicator, a second clock synchronizer configured to perform clock synchronization using the NTP-based clock synchronization signal received by the communicator and used separately from the first clock synchronizer, and a controller configured to select any one of the first clock synchronizer and the second clock synchronizer in an active mode and control the selected clock synchronizer so that clock synchronization is performed.

The first clock synchronizer may include a first pattern analyzer configured to analyze a consecutive reception pattern of contact signals received by the communicator, a first validity determiner configured to determine, when it is determined that an abnormal signal pattern is generated as a result of the reception pattern analysis by the first pattern analyzer, validity of a contact signal from which the abnormal signal pattern is generated and determine whether it is a transitory error situation, an interval-changing situation, or a consecutive error situation, and a first clock synchronization performer configured to perform differentiated clock synchronization according the first validity determiner's determination on whether it is the transitory error situation, the interval-changing situation, or the consecutive error situation.

When the first validity determiner determines that it is the transitory error situation, the first clock synchronization performer may maintain the active mode and maintain an internal time of the control device using a received contact signal without changing the internal time of the control device.

When the first validity determiner determines that it is the interval-changing situation, the first clock synchronization performer may switch to an inactive mode and change an internal time of the control device using a received contact signal.

When the first validity determiner determines that it is the consecutive error situation, the first clock synchronization performer may switch to an inactive mode and maintain an internal time of the control device using a received contact signal without changing the internal time of the control device.

When the result of the reception pattern analysis by the first pattern analyzer indicates a normal situation in which a normal signal pattern is generated, the first clock synchronization performer may maintain the active mode and change an internal time of the control device using a received contact signal.

When only some received contact signals are not received at the set intervals, the first validity determiner may determine that it is the transitory error situation.

When all contact signals are uniformly delayed or received at shorter intervals, the first validity determiner may determine that it is the interval-changing situation in which the set intervals are changed.

When contact signals are irregularly delayed or received at shorter intervals, the first validity determiner may determine that it is the consecutive error situation.

The second clock synchronizer may include a second pattern analyzer configured to analyze a consecutive reception pattern of NTP-based clock synchronization signals received by the communicator, a second validity determiner configured to determine, when it is determined that an abnormal signal pattern is generated as a result of the reception pattern analysis by the second pattern analyzer, validity of an NTP-based clock synchronization signal from which the abnormal signal pattern is generated and determine whether it is a transitory error situation, an interval-changing situation, or a consecutive error situation, and a second clock synchronization performer configured to perform differentiated clock synchronization according the second validity determiner's determination on whether it is the transitory error situation, the interval-changing situation, or the consecutive error situation.

When the second validity determiner determines that it is the transitory error situation, the second clock synchronization performer may maintain the active mode and maintain an internal time of the control device using a received NTP-based clock synchronization signal without changing the internal time of the control device.

When the second validity determiner determines that it is the interval-changing situation, the second clock synchronization performer may switch to an inactive mode and change an internal time of the control device using a received NTP-based clock synchronization signal.

When the second validity determiner determines that it is the consecutive error situation, the second clock synchronization performer may switch to an inactive mode and maintain an internal time of the control device using a received NTP-based clock synchronization signal without changing the internal time of the control device.

When the result of the reception pattern analysis by the second pattern analyzer indicates a normal situation in which a normal signal pattern is generated, the second clock synchronization performer may maintain the active mode and change an internal time of the control device using a received NTP-based clock synchronization signal.

When only some received NTP-based clock synchronization signals are not received at the set intervals, the second validity determiner may determine that it is the transitory error situation.

When all NTP-based clock synchronization signals are uniformly delayed or received at shorter intervals, the second validity determiner may determine that it is the interval-changing situation in which the set intervals are changed.

When NTP-based clock synchronization signals are irregularly delayed or received at shorter intervals, the second validity determiner may determine that it is the consecutive error situation.

The control device may further include a warning part configured to warn of a switch to the inactive mode when the active mode is switched to the inactive mode.

Other features and aspects will be apparent from the following detailed description, the drawings, and the claims.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the present invention will be described in detail through exemplary embodiments with reference to the accompanying drawings so that those of ordinary skill in the art can easily understand and implement the present invention. Although particular embodiments are illustrated and detailed description related thereto is given, these are not intended to limit various embodiments of the present invention to particular forms.

In describing the present invention, when it is determined that the detailed description of a related well-known function or configuration may unnecessarily obscure the gist of the present invention, the detailed description will be omitted.

When a component is described as being "connected" or "coupled" to another component, the component may be directly connected or coupled to the other component, but it is to be understood that another component may be interposed therebetween.

On the other hand, when a component is described as being "directly connected" or "directly coupled" to another component, it is to be understood that there is no intermediate component.

Figure 1:
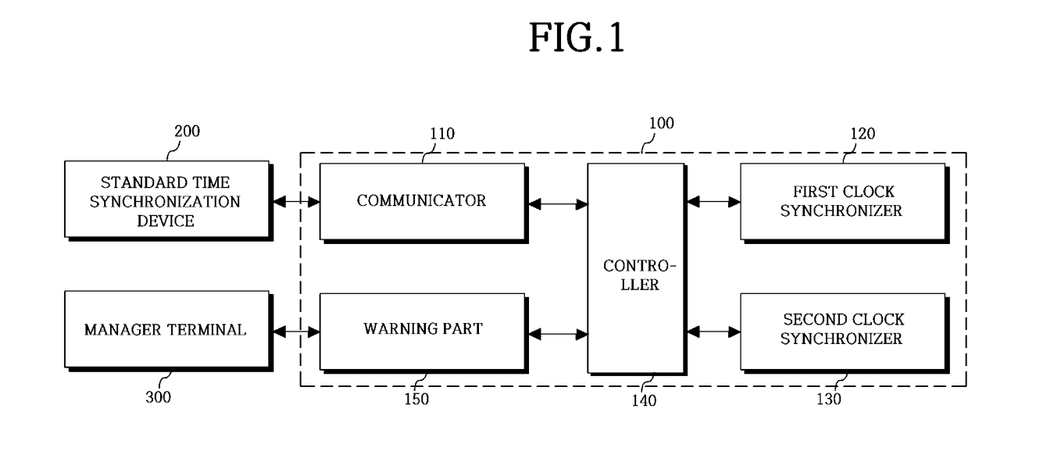
FIG. 1 is a block diagram illustrating a configuration of a control device for a control system with a dual clock synchronization mechanism according to an exemplary embodiment of the present invention.

FIG. 1 is a block diagram illustrating a configuration of a control device for a control system with a dual clock synchronization mechanism according to an exemplary embodiment of the present invention. A control device 100 for a control system with a dual clock synchronization mechanism according to the present invention is implemented as software, hardware, or a combination thereof and includes a communicator 110, a first clock synchronizer 120, a second clock synchronizer 130, and a controller 140.

The communicator 110 receives a contact signal, which is a periodic pulse signal instructing to start clock synchronization, and a network time protocol (NTP)-based clock synchronization signal including an accurate standard time from a standard time synchronization device 200 at set intervals. For example, the communicator 110 may be implemented to communicate with the standard time synchronization device 200 using Ethernet-based wired communication or a wireless communication method such as Bluetooth or the like.

Here, the standard time synchronization device 200 having the accurate standard time may be a clock master device or a grand master device having the accurate standard time as a reference for clock synchronization.

The standard time synchronization device 200 is set to transmit a contact signal and an NTP-based clock synchronization signal at the same or different intervals, and the control device 100 for a control system with a dual clock synchronization mechanism receives the signals through the communicator 110.

The first clock synchronizer 120 performs clock synchronization using contact signals received by the communicator 110. The first clock synchronizer 120 determines whether a situation is normal or abnormal by determining whether contact signals are received at the set intervals by the communicator 110 and determines whether to perform clock synchronization.

In a normal situation, the first clock synchronizer 120 changes an internal time of the control device 100 using a received contact signal. In an abnormal situation, the first clock synchronizer 120 determines validity of the contact signals and performs differentiated clock synchronization according to whether it is a transitory error situation, an interval-changing situation, or a consecutive error situation.

To prevent incorrect clock synchronization caused by rapidly repeated contact signals, a contact signal which is received within half of the contact signal interval value set in the control device 100 is determined as an incorrect contact signal and the first clock synchronizer 120 does not perform clock synchronization.

The second clock synchronizer 130 performs clock synchronization using NTP-based clock synchronization signals received by the communicator 110 but is used separately from the first clock synchronizer 120. Here, the second clock synchronizer 130 determines whether a situation is normal or abnormal by determining whether NTP-based clock synchronization signals are received at the set intervals by the communicator 110 and determines whether to perform clock synchronization.

Time information (the standard time) included in an NTP-based clock synchronization signal is more important than a time at which the NTP-based clock synchronization signal is received. However, when there is a large difference between the time at which the NTP-based clock synchronization signal is received and the reference, the content is also suspicious. Accordingly, a setting time (an NTP response reference time) is set, and the second clock synchronizer 130 determines whether time information exceeding the setting time is generated at a site due to a network error, determines whether a situation is normal or abnormal, and determines whether to perform clock synchronization.

In a normal situation, the second clock synchronizer 130 changes the internal time of the control device 100 using a received NTP-based clock synchronization signal. In an abnormal situation, the second clock synchronizer 130 determines validity of the NTP-based clock synchronization signals and performs differentiated clock synchronization according to whether it is a transitory error situation, an interval-changing situation, or a consecutive error situation.

The controller 140 selects any one of the first clock synchronizer 120 and the second clock synchronizer 130 in an active mode and controls the selected clock synchronizer so that clock synchronization is performed. Here, the first clock synchronizer 120 and the second clock synchronizer 130 are used separately, and clock synchronization processes are performed separately. Accordingly, to avoid collision between the two clock synchronizers, the controller 140 selects one of the two clock synchronizers to perform clock synchronization when both clock synchronizers are in the active mode, and selects one of the two clock synchronizers in the active mode to perform clock synchronization when any one is in the active mode and the other is in an inactive mode.

In this way, according to the present invention, a control system not only has a function of detecting a clock-synchronization counterfeiting attack and a clock synchronization error but also detects a clock synchronization problem resulting from various circumstances of a site to analyze a situation related to the clock synchronization problem. Therefore, it is possible to efficiently handle a clock synchronization problem resulting from various circumstances, and thus the control system can be stably managed.

Figure 2:
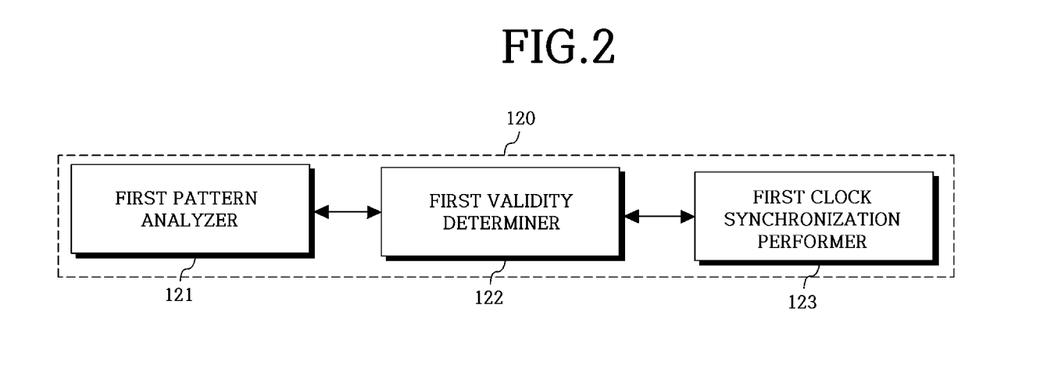
FIG. 2 is a block diagram illustrating a configuration of a first clock synchronizer of the control device for a control system with a dual clock synchronization mechanism according to an exemplary embodiment of the present invention.

FIG. 2 is a block diagram illustrating a configuration of a first clock synchronizer of the control device for a control system with a dual clock synchronization mechanism according to an exemplary embodiment of the present invention. To efficiently handle a clock synchronization problem resulting from various circumstances of a site, the first clock synchronizer 120 includes a first pattern analyzer 121, a first validity determiner 122, and a first clock synchronization performer 123 as shown in FIG. 2.

The first pattern analyzer 121 analyzes a consecutive reception pattern of contact signals received by the communicator 110. For example, the first pattern analyzer 121 may analyze a consecutive reception pattern of contact signals by checking whether a contact signal is properly received every set interval.

The first pattern analyzer 121 determines that a situation is normal when a contact signal is properly received every set interval, and determines that a situation is abnormal when a contact signal is received faster or slower than the set interval and an abnormal signal pattern is generated.

When it is determined that an abnormal signal pattern is generated as a result of reception pattern analysis by the first pattern analyzer 121, the first validity determiner 122 determines validity of a contact signal from which the abnormal signal pattern is generated and determines whether it is a transitory error situation, an interval-changing situation, or a consecutive error situation.

Figure 3:
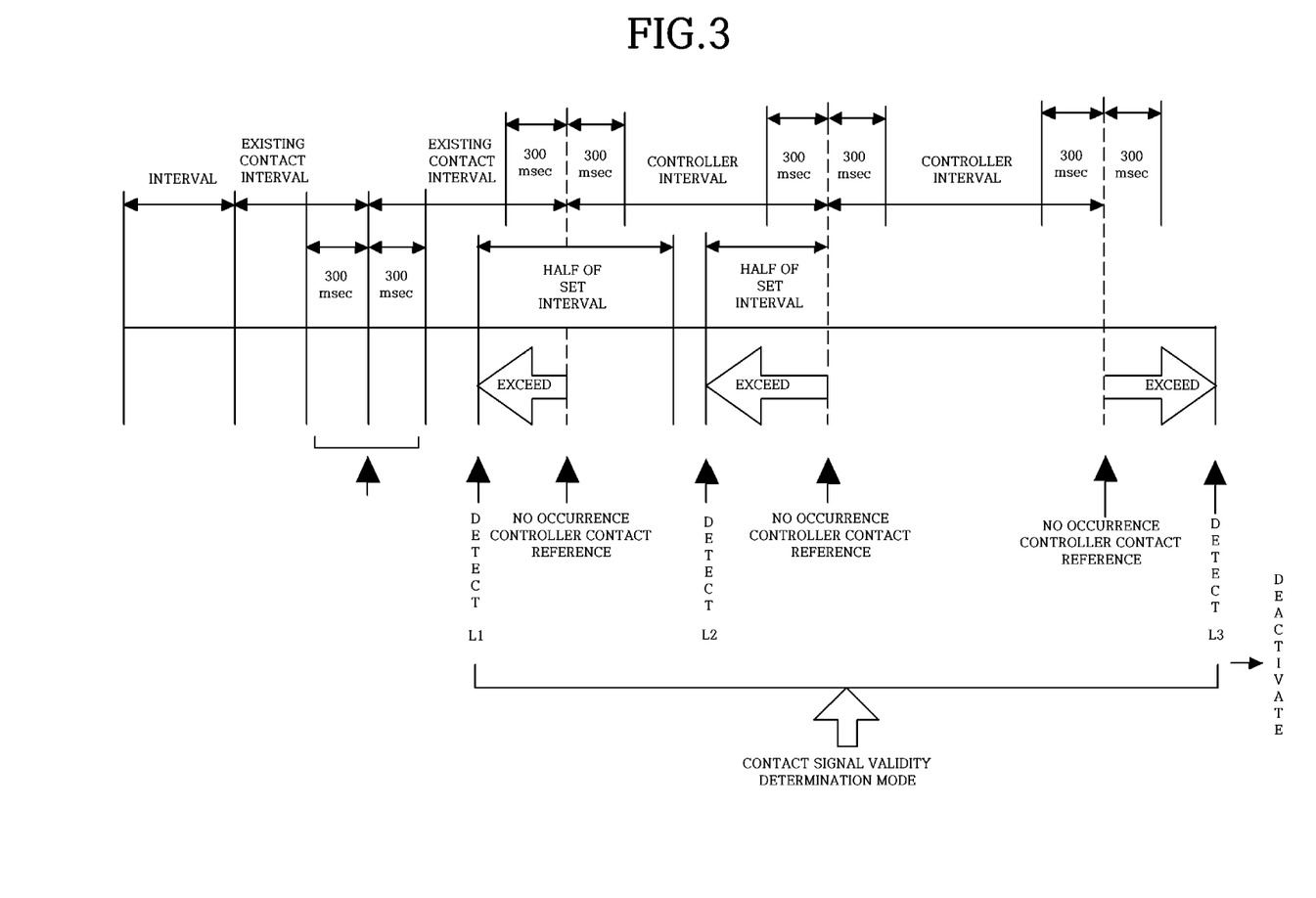
FIG. 3 is a diagram illustrating a contact signal reception pattern in a transitory error situation.

FIG. 3 is a diagram illustrating a contact signal reception pattern in a transitory error situation. Referring to FIG. 3, there is a transitory error situation. Accordingly, one of three contact signals received at set intervals is temporarily delayed, and then a normal situation is recovered.

When only some contact signals are not received at the set intervals as shown in FIG. 3, the first validity determiner 122 determines that it is a transitory error situation.

Figure 4:
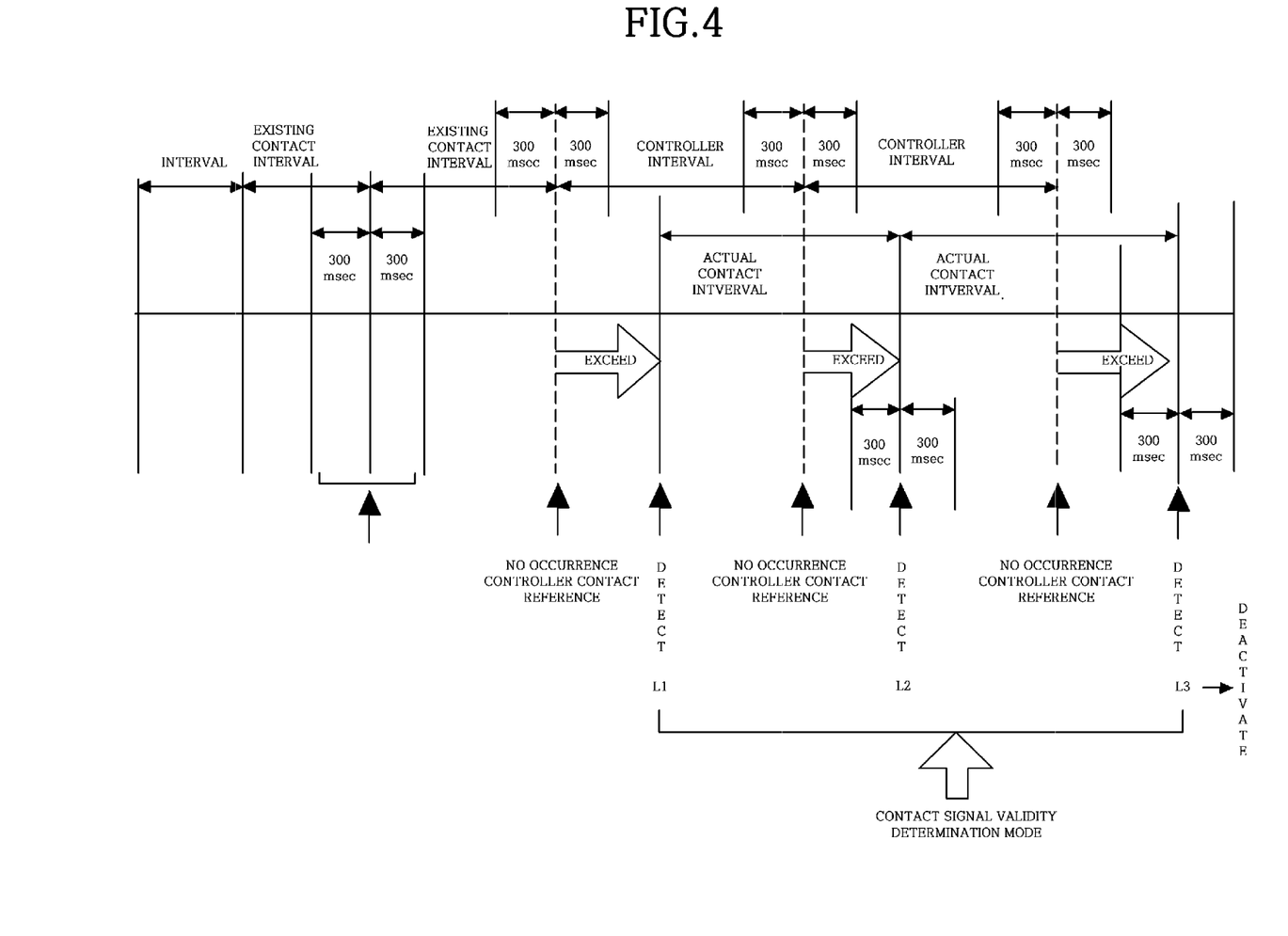
FIG. 4 is a diagram illustrating a contact signal reception pattern in an interval-changing situation.

FIG. 4 is a diagram illustrating a contact signal reception pattern in an interval-changing situation. Referring to FIG. 4, set intervals of contact signals are changed by an operator, and three contact signals which have been received at previously set intervals are uniformly delayed.

When all received contact signals are uniformly delayed or all contact signals are received at shorter intervals as shown in FIG. 4, the first validity determiner 122 determines that it is an interval-changing situation in which the set intervals are changed.

Figure 5:
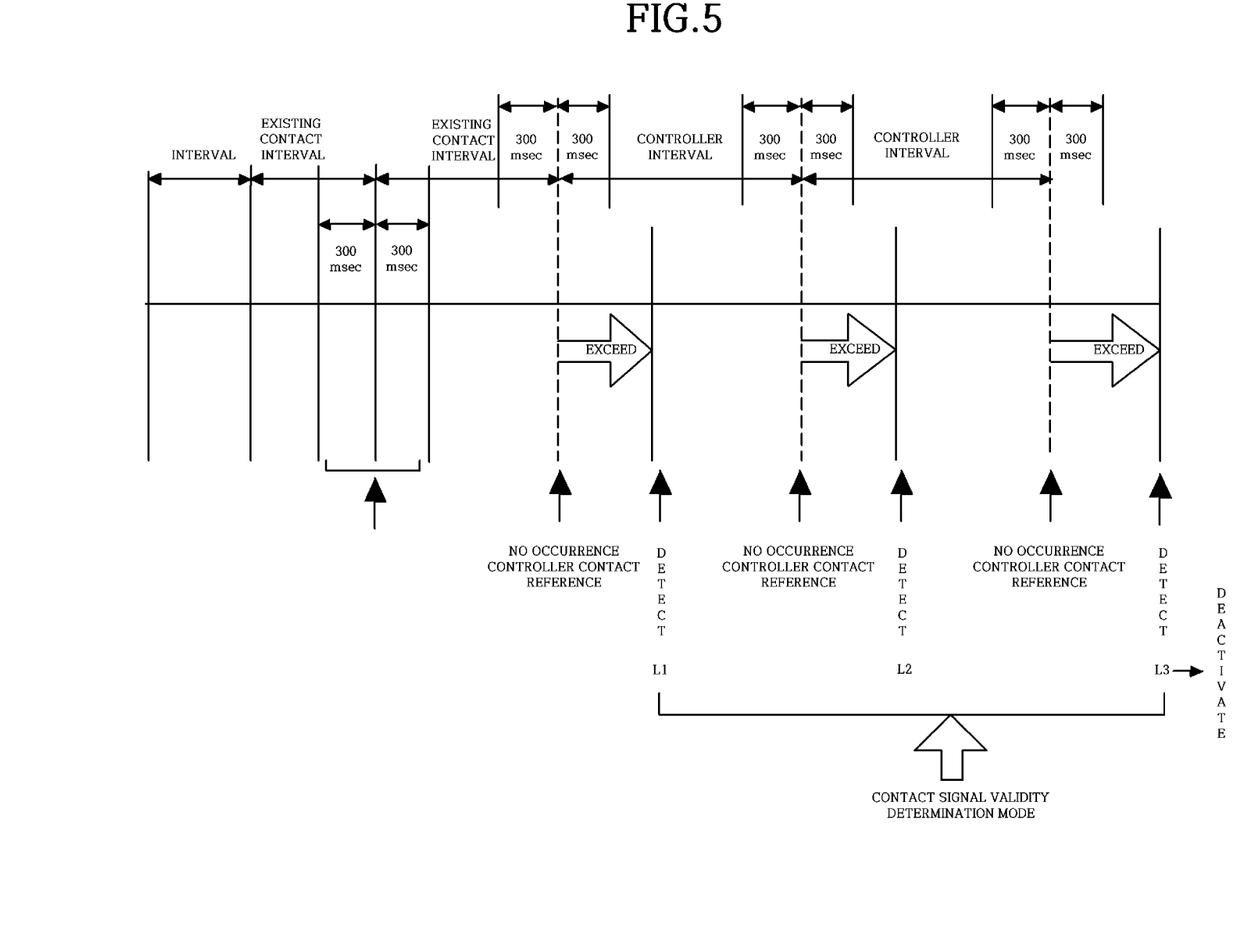
FIG. 5 is a diagram illustrating a contact signal reception pattern in a consecutive error situation.

FIG. 5 is a diagram illustrating a contact signal reception pattern in a consecutive error situation. Referring to FIG. 5, a consecutive error situation occurs, and three contact signals which have been received at set intervals are irregularly delayed or received at shorter intervals.

When each of received contact signals is irregularly delayed or received at shorter intervals as shown in FIG. 5, the first validity determiner 122 determines that it is a consecutive error situation.

When a result of reception pattern analysis by the first pattern analyzer 121 indicates a normal situation in which a normal signal pattern is generated, the first clock synchronization performer 123 maintains the active mode and changes the internal time of the control device 100 using a received contact signal.

Meanwhile, the first clock synchronization performer 123 performs differentiated clock synchronization according to whether it is determined by the first validity determiner 122 that it is a transitory error situation, an interval-changing situation, or a consecutive error situation.

When it is determined by the first validity determiner 122 that it is a transitory error situation, the first clock synchronization performer 123 maintains the active mode and maintains the internal time of the control device 100 using a received contact signal without changing the internal time of the control device 100.

Meanwhile, when it is determined by the first validity determiner 122 that it is an interval-changing situation, the first clock synchronization performer 123 switches to the inactive mode and changes the internal time of the control device 100 using a received contact signal.

Meanwhile, when it is determined by the first validity determiner 122 that it is a consecutive error situation, the first clock synchronization performer 123 switches to the inactive mode and maintains the internal time of the control device 100 using a received contact signal without changing the internal time of the control device 100.

In this way, the present invention is implemented to detect a clock synchronization problem resulting from various circumstances of a site on the basis of contact signals and analyze a situation related to the clock synchronization problem.

Accordingly, it is possible to efficiently handle a clock synchronization problem resulting from various circumstances, and thus a control system can be stably managed.

Figure 6:
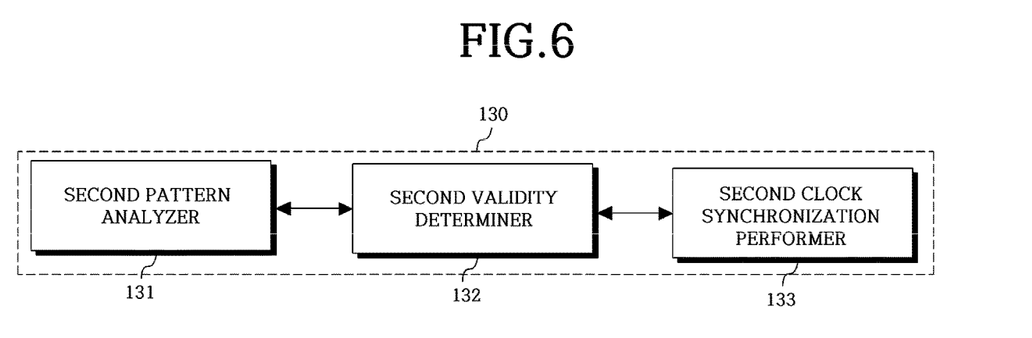
FIG. 6 is a block diagram illustrating a configuration of a second clock synchronizer of the control device for a control system with a dual clock synchronization mechanism according to an exemplary embodiment of the present invention.

FIG. 6 is a block diagram illustrating a configuration of a second clock synchronizer of the control device for a control system with a dual clock synchronization mechanism according to an exemplary embodiment of the present invention. To efficiently handle a clock synchronization problem resulting from various circumstances of a site, the second clock synchronizer 130 includes a second pattern analyzer 131, a second validity determiner 132, and a second clock synchronization performer 133 as shown in FIG. 6.

The second pattern analyzer 131 analyzes a consecutive reception pattern of NTP-based clock synchronization signals received by the communicator 110. For example, the second pattern analyzer 131 may analyze a consecutive reception pattern of NTP-based clock synchronization signals by checking whether an NTP-based clock synchronization signal is properly received every set interval.

The second pattern analyzer 131 determines that a situation is normal when an NTP-based clock synchronization signal is properly received every set interval, and determines that the situation is abnormal when an NTP-based clock synchronization signal is received faster or slower than the set interval and an abnormal signal pattern is generated.

When it is determined that an abnormal signal pattern is generated as a result of reception pattern analysis by the second pattern analyzer 131, the second validity determiner 132 determines validity of an NTP-based clock synchronization signal from which the abnormal signal pattern is generated and determines whether it is a transitory error situation, an interval-changing situation, or a consecutive error situation.

When only some NTP-based clock synchronization signals are not received at the set intervals, the second validity determiner 132 determines that it is a transitory error situation.

When all received NTP-based clock synchronization signals are uniformly delayed or all NTP-based clock synchronization signals are received at shorter intervals, the second validity determiner 132 determines that it is an interval-changing situation in which the set intervals are changed.

When each received NTP-based clock synchronization signal is irregularly delayed or received at shorter intervals, the second validity determiner 132 determines that it is a consecutive error situation.

When a result of reception pattern analysis by the second pattern analyzer 131 indicates a normal situation in which a normal signal pattern is generated, the second clock synchronization performer 133 maintains the active mode and changes the internal time of the control device 100 using a received NTP-based clock synchronization signal.

Meanwhile, the second clock synchronization performer 133 performs differentiated clock synchronization according to whether it is determined by the second validity determiner 132 that it is a transitory error situation, an interval-changing situation, or a consecutive error situation.

When it is determined by the second validity determiner 132 that it is a transitory error situation, the second clock synchronization performer 133 maintains the active mode and maintains the internal time of the control device 100 using a received NTP-based clock synchronization signal without changing the internal time of the control device 100.

Meanwhile, when it is determined by the second validity determiner 132 that it is an interval-changing situation, the second clock synchronization performer 133 switches to the inactive mode and changes the internal time of the control device 100 using a received NTP-based clock synchronization signal.

Meanwhile, when it is determined by the second validity determiner 132 that it is a consecutive error situation, the second clock synchronization performer 133 switches to the inactive mode and maintains the internal time of the control device 100 using a received NTP-based clock synchronization signal without changing the internal time of the control device 100.

In this way, the present invention is implemented to detect a clock synchronization problem resulting from various circumstances of a site on the basis of NTP-based clock synchronization signals and analyze a situation related to the clock synchronization problem. Accordingly, it is possible to efficiently handle a clock synchronization problem resulting from various circumstances, and thus a control system can be stably managed.

Meanwhile, according to an additional aspect of the present invention, the control device 100 for a control system with a dual clock synchronization mechanism may further include a warning part 150. When the control device 100 is switched to the inactive mode, the warning part 150 warns of the switch to the inactive mode.

For example, the warning part 150 may transmit a message for warning of the switch to the inactive mode to a manager terminal 300, such as a personal computer (PC), a smartphone, or the like, through a wired or wireless network, but is not limited thereto.

A manager who checks the message for warning of the switch to the inactive mode transmitted by the warning part 150 through the manager terminal 300 is aware of the abnormal situation, copes with the abnormal situation with proper handling, and then switches the control device 100 to the active mode for recovery.

In this way, according to the present invention, a control system not only has a function of detecting a clock-synchronization counterfeiting attack and a clock synchronization error but also detects a clock synchronization problem resulting from various circumstances of a site to analyze a situation related to the clock synchronization problem and warn of the situation. Therefore, it is possible to efficiently handle a clock synchronization problem resulting from various circumstances of a site, and the control system can be stably managed.

Various exemplary embodiments disclosed in this specification and drawings only show specific examples to help understanding and are not intended to limit the scope of the present invention.

Therefore, the scope of various exemplary embodiments of the present invention should be construed as encompassing all alterations or modifications derived from the technical spirit of the exemplary embodiments of the present invention.

The present invention is industrially applicable to the field of clock synchronization technology of control devices for controlling distributed control systems and the application technology field thereof.

What is claimed is:

1. A control device for a control system with a dual clock synchronization mechanism, the control device comprising:
    a communicator configured to receive a contact signal, which is a periodic pulse signal instructing to start clock synchronization, and a network time protocol (NTP)-based clock synchronization signal including an accurate standard time from a standard time synchronization device at set intervals;
    a first clock synchronizer configured to perform clock synchronization using the contact signal received by the communicator;
    a second clock synchronizer configured to perform clock synchronization using the NTP-based clock synchronization signal received by the communicator and used separately from the first clock synchronizer; and
    a controller configured to select any one of the first clock synchronizer and the second clock synchronizer in an active mode and control the selected clock synchronizer so that clock synchronization is performed.

2. The control device of claim 1, wherein the first clock synchronizer comprises:
    a first pattern analyzer configured to analyze a consecutive reception pattern of contact signals received by the communicator;
    a first validity determiner configured to determine, when it is determined that an abnormal signal pattern is generated as a result of the reception pattern analysis by the first pattern analyzer, validity of a contact signal from which the abnormal signal pattern is generated and determine whether it is a transitory error situation, an interval-changing situation, or a consecutive error situation; and
    a first clock synchronization performer configured to perform differentiated clock synchronization according the first validity determiner's determination on whether it is the transitory error situation, the interval-changing situation, or the consecutive error situation.

3. The control device of claim 2, wherein, when the first validity determiner determines that it is the transitory error situation, the first clock synchronization performer maintains the active mode and maintains an internal time of the control device using a received contact signal without changing the internal time of the control device.

4. The control device of claim 3, further comprising a warning part configured to warn of a switch to the inactive mode when the active mode is switched to the inactive mode.

5. The control device of claim 2, wherein, when the first validity determiner determines that it is the interval-changing situation, the first clock synchronization performer switches to an inactive mode and changes an internal time of the control device using a received contact signal.

6. The control device of claim 2, wherein, when the first validity determiner determines that it is the consecutive error situation, the first clock synchronization performer switches to an inactive mode and maintains an internal time of the control device using a received contact signal without changing the internal time of the control device.

7. The control device of claim 2, wherein, when the result of the reception pattern analysis by the first pattern analyzer indicates a normal situation in which a normal signal pattern is generated, the first clock synchronization performer maintains the active mode and changes an internal time of the control device using a received contact signal.

8. The control device of claim 2, wherein, when only some received contact signals are not received at the set intervals, the first validity determiner determines that it is the transitory error situation.

9. The control device of claim 2, wherein, when all contact signals are uniformly delayed or received at shorter intervals, the first validity determiner determines that it is the interval-changing situation in which the set intervals are changed.

10. The control device of claim 2, wherein, when contact signals are irregularly delayed or received at shorter intervals, the first validity determiner determines that it is the consecutive error situation.

11. The control device of claim 2, wherein, when NTP-based clock synchronization signals are irregularly delayed or received at shorter intervals, the second validity determiner determines that it is the consecutive error situation.

12. The control device of claim 1, wherein the second clock synchronizer comprises:
- a second pattern analyzer configured to analyze a consecutive reception pattern of NTP-based clock synchronization signals received by the communicator;
- a second validity determiner configured to determine, when it is determined that an abnormal signal pattern is generated as a result of the reception pattern analysis by the second pattern analyzer, validity of an NTP-based clock synchronization signal from which the abnormal signal pattern is generated and determine whether it is a transitory error situation, an interval-changing situation, or a consecutive error situation; and
- a second clock synchronization performer configured to perform differentiated clock synchronization according the second validity determiner's determination on whether it is the transitory error situation, the interval-changing situation, or the consecutive error situation.

13. The control device of claim 12, wherein, when the second validity determiner determines that it is the transitory error situation, the second clock synchronization performer maintains the active mode and maintains an internal time of the control device using a received NTP-based clock synchronization signal without changing the internal time of the control device.

14. The control device of claim 12, wherein, when the second validity determiner determines that it is the interval-changing situation, the second clock synchronization performer switches to an inactive mode and changes an internal time of the control device using a received NTP-based clock synchronization signal.

15. The control device of claim 12, wherein, when the second validity determiner determines that it is the consecutive error situation, the second clock synchronization performer switches to an inactive mode and maintains an internal time of the control device using a received NTP-based clock synchronization signal without changing the internal time of the control device.

16. The control device of claim 12, wherein, when the result of the reception pattern analysis by the second pattern analyzer indicates a normal situation in which a normal signal pattern is generated, the second clock synchronization performer maintains the active mode and changes an internal time of the control device using a received NTP-based clock synchronization signal.

17. The control device of claim 12, wherein, when only some received NTP-based clock synchronization signals are not received at the set intervals, the second validity determiner determines that it is the transitory error situation.

18. The control device of claim 12, wherein, when all NTP-based clock synchronization signals are uniformly delayed or received at shorter intervals, the second validity determiner determines that it is the interval-changing situation in which the set intervals are changed.

* * * * *